March 30, 1937. L. V. ANDREWS ET AL 2,075,419
FURNACE
Filed April 2, 1935 3 Sheets-Sheet 1

Inventors
L. V. ANDREWS
GUSTAV A. REHM
By Albert G. Blodgett
Attorney

March 30, 1937.  L. V. ANDREWS ET AL  2,075,419
FURNACE
Filed April 2, 1935   3 Sheets-Sheet 2

Inventors
L. V. ANDREWS
GUSTAV A. REHM
By Albert G. Blodgett
Attorney

March 30, 1937.    L. V. ANDREWS ET AL    2,075,419
FURNACE
Filed April 2, 1935    3 Sheets-Sheet 3

Inventors
L. V. ANDREWS
GUSTAV A. REHM
By Albert H. Blodgett
Attorney

Patented Mar. 30, 1937

2,075,419

UNITED STATES PATENT OFFICE 2,075,419

FURNACE

L. V. Andrews and Gustav A. Rehm, Worcester, Mass., assignors to Riley Stoker Corporation, Worcester, Mass., a corporation of Massachusetts Application April 2, 1935, Serial No. 14,318

21 Claims. (Cl. 122—235)

This invention relates to furnaces, and more particularly to combustion furnaces for pulverized fuel, from which the ash or slag is withdrawn in molten condition.

Various difficulties have arisen in the operation of furnaces of this so-called "slag tap" type as heretofore constructed. It is necessary to maintain high temperatures in order to melt the ash, and it is desirable to protect the furnace walls by means of water tubes so that the walls will be capable of withstanding the intense heat of the furnace. Such water tubes are preferably arranged vertically, to simplify the furnace construction and to obtain rapid circulation of the water and steam, and the lower ends of the tubes are usually connected to horizontal headers. It has been found that if these headers are located below the furnace bottom the molten slag will solidify when the furnace is shut down or operated at low rates of combustion, and when the temperature is again increased the solidified slag will expand and crowd against the water tubes with a tremendous pressure, forcing them outwardly and producing leaks in the furnace bottom and damage to the water tubes and associated parts. Moreover, in furnaces having headers so located, it is difficult to make suitable provision for the withdrawal of the molten slag, and for access to the interior of the furnace. It has been found that if the headers are located above the furnace bottom, the refractory materials forming the marginal portions of the bottom are incapable of withstanding the combined effect of the high temperature and the chemical action of the molten slag, and as a result the useful life of these refractories is very brief.

It is accordingly the main object of the present invention to overcome these difficulties and to provide a comparatively simple and inexpensive slag tap furnace which will operate successfully for long periods without repairs.

It is a further object of the invention to provide a slag tap furnace having water cooled side walls arranged in a novel manner to protect the marginal portions of the furnace bottom from excessive heat.

It is a further object of the invention to provide a slag tap furnace having water tubes arranged to protect the marginal portions of the furnace bottom, together with simple and convenient means for withdrawing the molten slag and for obtaining access to the interior of the furnace.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a vertical section through a portion of a slag tap furnace, the section being taken on the line 1—1 of Fig. 2;

Figure 5:
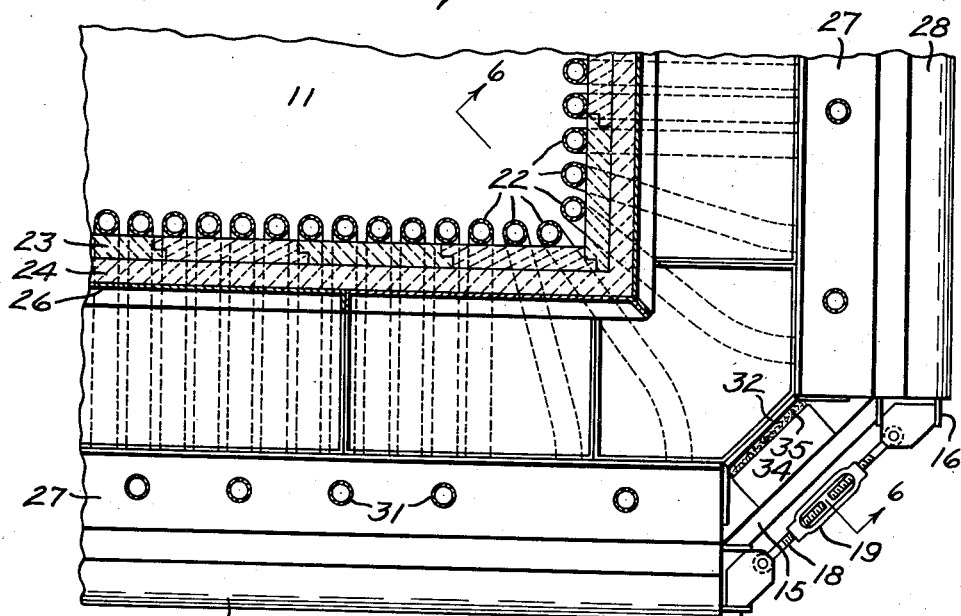
Fig. 5 is a section similar to Fig. 2, but at a different corner of the furnace, the section being taken on the line 5—5 of Fig. 6.

The embodiment illustrated comprises a furnace bottom or floor 10 formed of firebrick with a lining 11 of a suitable refractory material. The furnace bottom is generally rectangular in plan, and its marginal portions 12 slope upwardly and outwardly. This construction provides a concave upper surface which will serve to retain a pool of molten ash or slag 14 resulting from the combustion of slag-forming fuels such as pulverized coal. If the slag 14 should solidify as a result of a drop in furnace temperature, it will expand upon reheating, and the sloping portions 12 will allow the expanding slag to slide upwardly over them without causing harmful lateral forces. The bottom 10 is braced laterally by means of horizontal buckstays formed by channel members 15 and I-beams 16. At certain corners of the furnace, the adjacent ends of the I-beams 16 are connected by tie rods 18 provided with turnbuckles 19, as shown in Fig. 5. At other corners of the furnace, the ends of the I-beams are connected to a pair of spaced vertical columns 20, as shown in Fig. 2.

Figure 4:
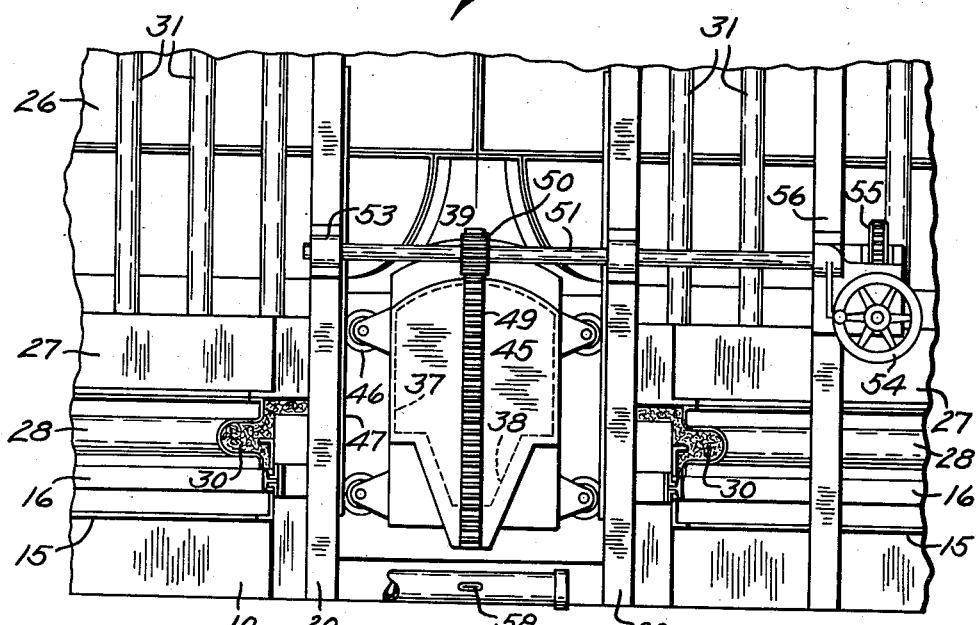
Fig. 4 is an elevation taken in the direction of the arrow 4 in Fig. 2.

In order to prevent damage to the furnace bottom as a result of the high temperatures normally maintained in a furnace of this type, we provide wall surfaces which overlie the marginal portions 12 of the bottom to shield them from the heat. These wall surfaces are preferably water cooled, so that they will absorb heat rapidly and maintain a comparatively cool zone adjacent to the margin of the slag pool 14. For this purpose we have provided at each side of the furnace a row of closely spaced water tubes 22 which slope upwardly and inwardly above the inclined portions 12 of the furnace bottom and thence vertically upward along the inner surfaces of the furnace walls. These tubes are preferably exposed on the furnace side so that they will absorb heat at a rapid rate. Blocks 23 of refractory material are mounted against the outside of the tubes, and these blocks are covered with a layer 24 of a suitable heat-insulation and a sheet-metal casing 26. It will be noted that the sloping portions of the tubes are located entirely below the point of fuel admission, the inclined portions of the furnace walls being free from fuel admission openings. Consequently these inclined portions are effective heat shields, and they prevent the deposition of slag directly on the margins of the slag basin. The lower ends of each row of tubes 22 are connected to a header 27, there being four of these headers in a furnace of the type illustrated in which all four walls are water cooled. The headers 27 are spaced slightly above the outer portion of the furnace bottom 10, and they are connected to the buckstay I-beams 16 by means of U-shaped flexible sheet-metal seal plates 28 which prevent the leakage of air into the furnace without interfering with the free movement of the headers as a result of expansion and contraction produced by temperature changes. The ends of the seal plates 28 are closed by a suitable fibrous packing 30 (Fig. 4). Water is supplied to the headers 27 by means of suitable downcomer tubes 31. It will be understood that the upper ends of the tubes 22 and 31 may be connected to a suitable boiler, and that the heat of the furnace will produce a circulation downwardly in the tubes 31 and upwardly in the tubes 22. The construction described provides four substantially vertical water cooled walls enclosing a combustion chamber generally rectangular in horizontal cross-section. The marginal surfaces 12 of the slag collecting bottom are all located outside of the planes of the inner surfaces of the walls.

Figure 6:
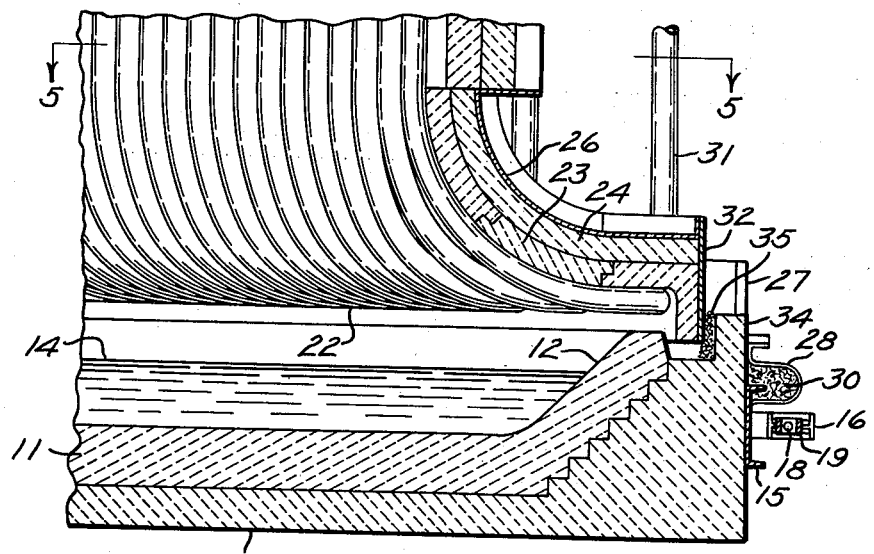
Fig. 6 is a section on the line 6—6 of Fig. 5.

At certain corners of the furnace, as shown in Figs. 5 and 6, a few of the tubes 22 are arranged in an outwardly-flaring fan-shaped arrangement to provide a support for the refractory blocks 23 thereabove. A vertical plate 32 extends between the adjacent ends of the headers 27 to hold the blocks 23 in position. A ledge 34 projects upwardly from the furnace bottom close to the plate 32, and a suitable fibrous packing 35 is provided between these parts to prevent leakage of air into the furnace.

Figure 1:
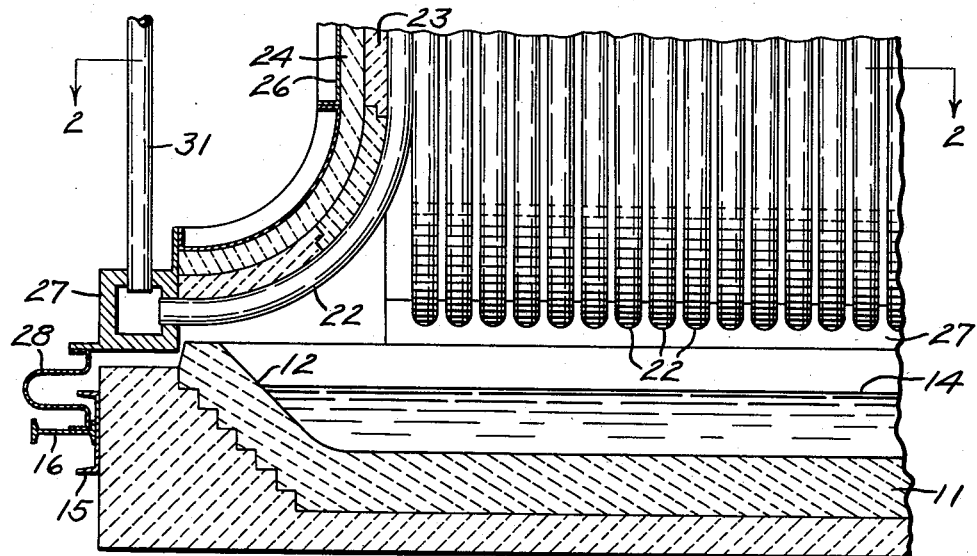
Figure 2:
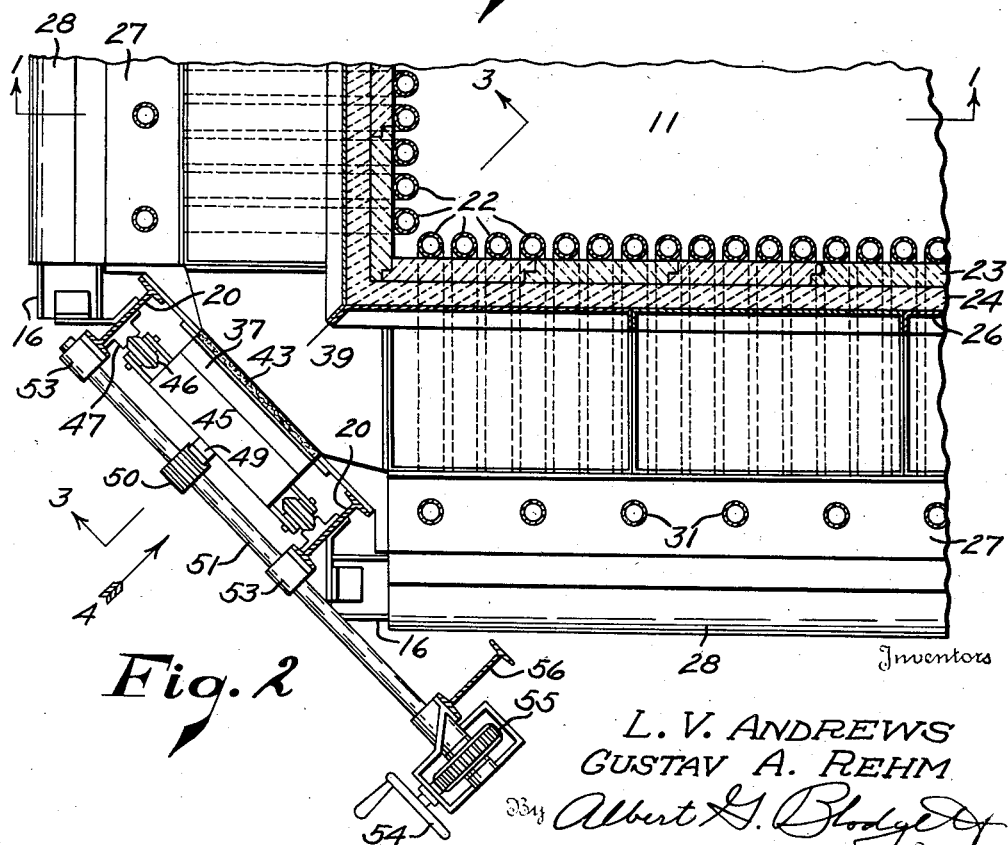
Fig. 2 is a section on the line 2—2 of Fig. 1.
Figure 3:
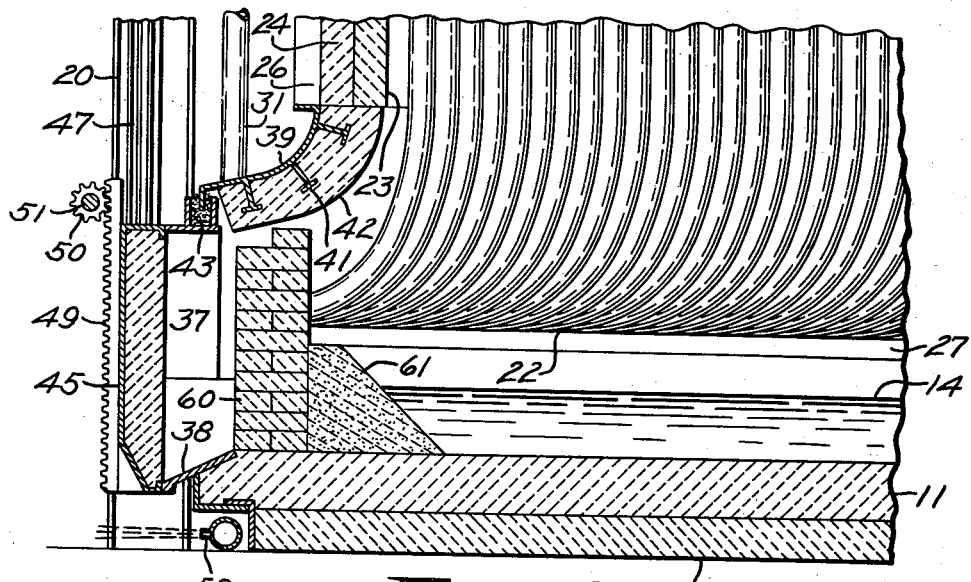
Fig. 3 is a section on the line 3—3 of Fig. 2.

At other corners of the furnace, as shown in Figs. 2, 3 and 4, provision is made for tapping off the slag and for obtaining access to the furnace. For this purpose there is provided a door frame 37 forming a slag spout 38 at its lower end and sufficiently large in its upper portion to permit a man to crawl therethrough. It will be noted that the tubes 22 of the adjacent rows are widely separated at their lower ends, so that a man can easily pass between them and enter the furnace. The door-frame 37 is mounted between and supported by the columns 20. A metal plate 39 (Fig. 3) is mounted above and to the rear of the door-frame, this plate being secured to the sheet-metal casing 26 at each side. The plate 39 is provided with lugs 41 which serve to support a lining 42 of refractory material on its lower and rearward face. Fibrous packing 43 is arranged to seal the joint between the front edge of the plate 39 and the top of the door-frame 37.

A refractory-lined door or gate 45 is slidable vertically at the front of the door frame, the door having wheels 46 at each side which engage grooved tracks 47 mounted on the columns 20. The door is provided with a vertical rack 49 which engages a pinion 50 mounted on a horizontal shaft 51. This shaft is supported in bearings 53 secured to the columns 20, and it may be rotated manually by means of a hand-wheel 54 and worm-gear mechanism 55 mounted on a column 56.

A nozzle 58 is located beneath the slag spout 38 to direct a jet of water against the falling stream of slag, as is customary in this art, to cool the slag and convey it to a place of disposal. A wall 60 of loosely piled fire-brick is provided in the rear of the door 45 to protect the door and its frame from the radiant heat of the furnace. Loose refractory material, such as fly-ash 61, is placed in the rear of the wall 60 to provide a sloping dam for the slag pool 14.

The operation of the invention will now be apparent from the above disclosure. The furnace is fired with a slag-forming fuel, such as pulverized coal, and the furnace temperature is ordinarily maintained high enough to melt the ash and produce a pool of molten slag 14 on the furnace bottom. If the temperature should drop the slag will solidify, and upon reheating the slag mass will expand and slide upwardly along the sloping margins 12 of the bottom without damaging any of the furnace structure. The lower portions of the water tubes 22 overlie the marginal refractory surfaces 12 and not only shield these parts from the high furnace temperatures but actually cool them by reason of the rapid heat transmission by radiation to the exposed metal tubes. Moreover, since the furnace walls extend inwardly beyond the outer edges of the slag pool 14, none of the falling slag is deposited directly on the surfaces 12, and for this reason there is no opportunity for slag to flow continuously downward over these surfaces and destroy them by chemical action and erosion in a comparatively short time. The useful life of the furnace is thus enormously increased. When a substantial amount of slag has accumulated, the operator will turn the hand-wheel 54 to raise the gate 45. He will then remove the loose bricks 60 and the fly-ash dam 61, whereupon the slag will flow outwardly through the spout 38 and into the path of the water stream from the nozzle 58. Upon completion of the tapping operation, the fly-ash 61 and bricks 60 will be replaced, and the gate 45 closed. The door-frame 37 provides a large-sized opening through which suitable tools can be manipulated if necessary to start the slag flowing properly. Moreover, this opening makes it possible for the operator to enter the furnace during a shut-down.

Having thus described our invention, what we claim as new and desire to secure by Letters Patent is:

1. A furnace of the slag tap type comprising a bottom shaped to retain a pool of molten slag, upright side walls, one of said side walls having a lower portion located outside of the plane of the inner surface of the wall and overlying the adjacent marginal portion of the furnace bottom to shield the same from the heat of the furnace, said lower portion being free from fuel admission openings and extending inwardly beyond the outer edge of the slag pool, and means for withdrawing slag from said bottom in liquid form.

2. A furnace of the slag tap type comprising a bottom shaped to retain a pool of molten slag and having an upwardly and outwardly sloping marginal portion, upright side walls, one of said side walls having a lower portion located outside of the plane of the inner surface of the wall and overlying the sloping marginal portion of the furnace bottom to shield the same from the heat of the furnace, said lower portion being free from fuel admission openings and extending inwardly beyond the outer edge of the slag pool, and means for withdrawing slag from said bottom in liquid form.

3. A furnace of the slag tap type comprising a bottom shaped to retain a pool of molten slag, upright side walls, one of said side walls having an upwardly and inwardly inclined lower portion which extends inwardly beyond the outer edge of the slag pool and overlies the adjacent marginal portion of the furnace bottom and shields the same from the heat of the furnace, said inclined portion being free from fuel admission openings, and means for withdrawing slag from said bottom in liquid form.

4. A furnace of the slag tap type comprising a bottom shaped to retain a pool of molten slag and provided with an upwardly and outwardly sloping marginal portion, a side wall having an upwardly and inwardly inclined lower portion which extends inwardly beyond the outer edge of the slag pool and overlies the adjacent marginal portion of the furnace bottom and shields the same from the heat of the furnace, said inclined portion being free from fuel admission openings, and means for withdrawing slag from said bottom in liquid form.

5. A furnace of the slag tap type comprising a bottom of refractory material shaped to retain a pool of molten slag and provided with an upwardly and outwardly sloping marginal portion, a substantially vertical side wall for the furnace, an upwardly and inwardly sloping wall connected to the lower end of the vertical side wall and overlying the said marginal portion of the furnace bottom to shield the same from the heat of the furnace, said sloping walls being free from fuel admission openings and extending inwardly beyond the outer edge of the slag pool, and means for withdrawing slag from said bottom in liquid form.

6. A furnace of the slag tap type comprising a bottom shaped to retain a pool of molten slag and generally rectangular in plan, side walls having upwardly and inwardly sloping portions extending inwardly beyond the outer edges of the slag pool and overlying the marginal portions of the furnace bottom to shield the same from the heat of the furnace, said sloping portions being free from fuel admission openings, and a slag spout located at one corner of the furnace bottom.

7. A furnace of the slag tap type comprising a bottom shaped to retain a pool of molten slag, water cooled walls having parts extending inwardly beyond the outer edges of the slag pool and overlying the marginal portions of the furnace bottom to shield said portions from the heat of the furnace and cool said portions by absorption of heat radiated therefrom, said overlying parts being free from fuel admission openings, and means for withdrawing slag from said bottom in liquid form.

8. A furnace of the slag tap type comprising a bottom shaped to retain a pool of molten slag, upwardly and inwardly sloping water cooled walls extending inwardly beyond the outer edges of the slag pool and located close to and above the marginal portions of the furnace bottom to shield said portions from the heat of the furnace and cool said portions by absorption of heat radiated therefrom, said sloping walls being free from fuel admission openings, and means for withdrawing slag from said bottom in liquid form.

9. A furnace of the slag tap type comprising a bottom shaped to retain a pool of molten slag, means providing exposed metallic water cooled surfaces extending inwardly beyond the outer edges of the slag pool and located close to and above the marginal portions of the furnace bottom to shield said portions from the heat of the furnace and cool said portions by absorption of heat radiated therefrom, said water cooled surfaces being free from fuel admission openings, and means for withdrawing slag from said bottom in liquid form.

10. A furnace of the slag tap type comprising a bottom shaped to retain a pool of molten slag and provided with an upwardly and outwardly sloping marginal portion, means providing exposed metallic water cooled surfaces extending inwardly beyond the outer edges of the slag pool and located close to and above the said marginal portion and inclined upwardly and inwardly, the water cooled surfaces being arranged to shield the said marginal portion from the heat of the furnace and cool said portion by absorption of heat radiated therefrom, said water cooled surfaces being free from fuel admission openings, and means for withdrawing slag from said bottom in liquid form.

11. A furnace of the slag tap type comprising a bottom shaped to retain a pool of molten slag, rows of closely spaced exposed water tubes extending inwardly beyond the outer edges of the slag pool and sloping inwardly and upwardly close to and above the marginal portions of the furnace bottom to shield said portions from the heat of the furnace and cool said portions by absorption of heat radiated therefrom, the sloping tubes being located entirely below the point of fuel admission, and means for withdrawing slag from said bottom in liquid form.

12. A furnace of the slag tap type comprising a bottom shaped to retain a pool of molten slag, a horizontal header at one side of the bottom, a row of water tubes connected at their lower ends to the header and sloping inwardly and upwardly therefrom close to and above the adjacent marginal portion of the furnace bottom to shield said portion from the heat of the furnace and cool said portion by absorption of heat radiated therefrom, the tubes thence extending substantially vertically upward and the sloping portions of the tubes being located entirely below the point of fuel admission and extending inwardly beyond the outer edges of the slag pool, and means for withdrawing slag from said bottom in liquid form.

13. A furnace of the slag tap type comprising a bottom shaped to retain a pool of molten slag, a horizontal header at one side of the bottom, a row of closely spaced exposed water tubes connected at their lower ends to the header and sloping inwardly and upwardly therefrom close to and above the adjacent marginal portion of the furnace bottom to shield said portion from the heat of the furnace and cool said portion by absorption of heat radiated therefrom, the tubes thence extending substantially vertically upward and the sloping portions of the tubes being located entirely below the point of fuel admission and extending inwardly beyond the outer edges of the slag pool, and means for withdrawing slag from said bottom in liquid form.

14. A furnace of the slag tap type comprising a bottom shaped to retain a pool of molten slag, horizontal headers at two adjacent sides of the bottom, rows of water tubes connected at their lower ends to the headers and sloping inwardly and upwardly therefrom close to and above the adjacent marginal portions of the furnace bottom to shield said portions from the heat of the furnace and cool said portions by absorption of heat radiated therefrom, and a slag spout located between the adjacent ends of said headers.

15. A furnace as covered by claim 14, in which an access door is combined with the slag spout, whereby a man may enter the furnace by crawling between the water tubes at the ends of the respective rows.

16. A furnace of the slag tap type comprising a bottom shaped to retain a pool of molten slag, horizontal headers at two adjacent sides of the bottom, rows of water tubes connected at their lower ends to the headers and sloping inwardly and upwardly therefrom close to and above the marginal portions of the furnace bottom to shield said portions from the heat of the furnace and cool said portions by absorption of heat radiated therefrom, a combined access door and slag spout located between the adjacent ends of said headers, and refractory material in the rear of said door to form the roof of a passage which leads rearwardly from the door, between the water tubes at the ends of the respective rows, and thence into the furnace.

17. A furnace of the slag tap type comprising a bottom shaped to retain a pool of molten slag and generally rectangular in plan, a horizontal header adjacent to each side of the bottom, rows of water tubes connected at their lower ends to the headers and sloping inwardly and upwardly therefrom close to and above the adjacent marginal portions of the furnace bottom to shield said portions from the heat of the furnace and cool said portions by absorption of heat radiated therefrom, and a slag spout located at one corner of the furnace.

18. A furnace of the slag tap type comprising a bottom shaped to retain a pool of molten slag and having upwardly and outwardly sloping marginal portions, said bottom being generally rectangular in plan, a horizontal header adjacent to each side of the bottom, rows of water tubes connected at their lower ends to the headers and sloping inwardly and upwardly therefrom close to and above the adjacent marginal portions to shield said portions from the heat of the furnace and cool said portions by absorption of heat radiated therefrom, and a slag spout located at one corner of the furnace.

19. A furnace as covered by claim 18, in which the water tubes are exposed on the furnace side.

20. A furnace of the slag tap type comprising a bottom shaped to retain a pool of molten slag, horizontal headers at two adjacent sides of the bottom, rows of water tubes connected at their lower ends to the headers and sloping inwardly and upwardly therefrom close to and above the adjacent marginal portions of the furnace bottom to shield said portions from the heat of the furnace and cool said portions by absorption of heat radiated therefrom, certain of said water tubes being arranged in an outwardly-flaring fan-shaped arrangement near the intersection of said two sides of the bottom, and means for withdrawing slag from said bottom in liquid form.

21. A furnace of the slag tap type comprising four substantially vertical walls enclosing a combustion chamber generally rectangular in horizontal cross section, a slag collecting bottom beneath the walls and having inner marginal surfaces all located outside of the planes of the inner surfaces of the walls, and means for withdrawing slag from said bottom in liquid form.

L. V. ANDREWS.
GUSTAV A. REHM.